United States Patent

Crevecoeur et al.

[11] Patent Number: 6,160,027
[45] Date of Patent: Dec. 12, 2000

[54] PROCESS FOR THE PREPARATION OF POLYMER PARTICLES

[75] Inventors: Jeroen Joost Crevecoeur, Eindhoven; Eric Wilhelmus Johannes Frederik Neijman, Breda; Laurentius Nicolaas Ida Hubertus Nelissen, Eindhoven; Johannes Maria Zijderveld, Breda, all of Netherlands

[73] Assignee: Nova Chemicals (International) S.A., Fribourg, Switzerland

[21] Appl. No.: 09/214,258

[22] PCT Filed: Jul. 3, 1997

[86] PCT No.: PCT/EP97/03608

§ 371 Date: Dec. 30, 1998

§ 102(e) Date: Dec. 30, 1998

[87] PCT Pub. No.: WO98/01489

PCT Pub. Date: Jan. 15, 1998

[30] Foreign Application Priority Data

Jul. 4, 1996 [EP] European Pat. Off. .............. 96201904

[51] Int. Cl.$^7$ .................................. C08J 9/20; C08J 9/12

[52] U.S. Cl. .............. 521/56; 521/146; 524/157; 524/158; 524/317; 524/819; 524/836

[58] Field of Search ...................... 524/458, 836, 524/156, 173, 317, 819, 157, 158; 521/56, 146

[56] References Cited

U.S. PATENT DOCUMENTS 5,096,931  3/1992  Wittenberg et al. ............... 521/56 X

FOREIGN PATENT DOCUMENTS 1106143  3/1968  United Kingdom .

Primary Examiner—Fred Teskin
Attorney, Agent, or Firm—Kenneth H Johnson

[57] ABSTRACT

It is desirable to reduce the amount of volatile organic blowing agent in expandable polystyrene. This may be accomplished by partially polymerizing a mass of styrene and incorporating therein water together with an emulsifier. The partially polymerized mass is then polymerized to a high conversion using conventional suspension techniques. The polymer beads containing water which acts as a blowing agent are recovered.

10 Claims, No Drawings

PROCESS FOR THE PREPARATION OF POLYMER PARTICLES

The present invention relates to a process for the preparation of polymer particles containing a polymer of a vinylarene monomer and a physical foaming agent, and to such polymer particles.

Particles that contain such a polymer and foaming agent are generally known as expandable polymer particles. A well-known type of expandable polymer particles is expandable polystyrene. Expandable polystyrene is produced on a commercial scale by suspension polymerization. The foaming agent is usually a low-boiling hydrocarbon, such as a $C_3-C_8$ hydrocarbon, in particular pentane isomers. The expandable polystyrene is used for making foamed articles that are produced by expanding the polystyrene particles. In the expansion process the hydrocarbon foaming agent is released and may be emitted into the environment. Such emissions are regarded undesirable and ways are sought to avoid such emissions. One way is to recover or burn the emitted hydrocarbon. Another way is to reduce the amount of hydrocarbon foaming agent in the expandable polymer particles.

In U.S. Pat. No. 5,096,931 expandable polystyrene is described which contains polystyrene, a small amount of a polar polymer, some water and a reduced amount of hydrocarbon foaming agent. Although the content of hydrocarbon foaming agent has been reduced such agent must still be present to achieve satisfactory expansion.

GB-A-1,106,143 discloses a process for preparing water-expandable polystyrene particles by mixing by vigorous mechanical agitation styrene monomer, water and an emulsifier with a free-radical initiator to obtain an emulsion containing small droplets of water. Subsequently, the emulsion is suspended in an aqueous phase and the suspension obtained is subjected to polymerisation. In order to achieve a satisfactory expansion certain amounts of organic foaming agents are included.

In experiments to verify the merits of the teaching of the above GB patent it was found that the finely dispersed water droplets obtained in the first emulsion tend to coalesce and form bigger droplets during polymerisation. In an experiment in GB-A-1,106,143 it is confirmed that droplets bigger than 40 µm cause unsatisfactory foamed articles after expansion. Vigorous agitation is apparently necessary in this known-process to create and maintain the finely dispersed water droplets. However, it is awkward to stir in commercial operation at such high energy input.

Hence, it would be desirable if the tendency of the water droplets to coalesce could be reduced.

Surprisingly, it was found that the tendency for the water droplets to grow could be reduced by creating a viscous water-containing emulsion before completely polymerising the vinylarene monomer in suspension polymerisation. This makes it furthermore possible to stir less vigorously when emulsifying the water in the (partly polymerised) vinylarene monomer. Stirring can be carried out at an energy input equivalent to or less than 500 rotations per minute for a 70 l reactor, even at an energy input equivalent to or less than 350 rotations per minute for a 70 l reactor.

Accordingly, the present invention provides a process for the preparation of polymer particles containing a vinylarene polymer by suspension polymerisation, which process comprises:

a) pre-polymerising vinylarene monomers to a conversion degree of 20 to 70%, based on the vinylarene monomer, to yield a pre-polymerised mass, which pre-polymerised mass further contains water emulsified therein and an emulsifier, which pre-polymerisation is carried out with water already present or before water is added;

b) suspending the pre-polymerised mass in an aqueous medium to yield suspended droplets; and c) polymerising the vinylarene monomer in the suspended droplets to complete monomer conversion to yield suspended polymer particles.

A pre-polymerised mass differs from a mixture of polymerised vinylarene and vinylarene monomer, in that the first has a monomodal molecular weight distribution while the latter will in general have a bimodal distribution. For many applications, the latter will be disadvantageous in that the physical properties of the material will vary over a wider range. In order to obtain a monomodal distribution for a mixture of polymerised vinylarene and vinylarene monomer, the process conditions will have to be controlled very strictly. This is unattractive for commercial operations.

It is thought that the good results obtained in the process of the present invention, are due to the creation of the viscous pre-polymerised mass in which water has been emulsified before suspending the vinylarene in an aqueous medium for suspension polymerisation. The water droplets emulsified are rendered less mobile so that there is little tendency for them to coalesce or to move into the aqueous suspension medium.

The present process is capable of yielding polymer particles with satisfactory expandability properties that do not contain an organic foaming agent. The process is therefore preferably conducted in the substantial absence of $C_3-C_6$ hydrocarbon foaming agent. In the substantial absence means in an amount less than 0.5% wt based on the amount of vinylarene monomer, preferably less than 0.25% wt, more preferably in the complete absence of such foaming agents.

In a further embodiment of the invention the polymer particles obtained are separated from the aqueous mixture and, optionally, expanded to yield pre-expanded particles which are optionally treated further to yield foamed articles.

The creating of the viscous, pre-polymerised mass is preferably carried out by bulk polymerisation of the vinylarene monomer to the desired degree. The emulsification of water in the starting monomer can be achieved in various ways. In one embodiment, the water, an emulsifier and the vinylarene monomer are stirred to create an emulsion which is subsequently subjected to pre-polymerisation to the desired conversion degree to yield a pre-polymerised mass. In another embodiment, the vinylarene monomer is first subjected to pre-polymerisation, and subsequently, water and emulsifier are added to the (partially) pre-polymerised vinylarene mixture and water is emulsified. A third embodiment comprises pre-polymerisation of vinylarene monomer in the presence of emulsifier, and subsequently adding the water to be emulsified. In a fourth embodiment, emulsifier is prepared in-situ in the presence of water, and subsequently vinylarene monomer is added to the emulsifier obtained.

The emulsifiers are preferably compatible (soluble) with the vinylarene. The emulsifier may be selected from a wide range of compounds. Preferably, the emulsifier is of the type which gives water-in-oil emulsions. The emulsifier can be a non-ionic, an anionic or a cationic surfactant.

Suitable emulsifiers include nonionic surfactants such as sorbitan carboxylates, sorbitol or mannitol carboxylates, glycol or glycerol carboxylates, alkanolamides, alkyl phenols and dialkyl ethers. Any of these emulsifiers may contain a polyalkoxy chain with 1 to 20 oxyalkylene groups, such as oxyethylene or oxypropylene moieties. Suitable anionic emulsifiers include salts of long chain ($C_8$–$C_{30}$)carboxylic acids, long chain ($C_{8-30}$) alkyl sulphonic acid, alkylarylsulphonic acid, sulphosuccinic acid. The cation of these emulsifiers may suitably be an ammonium moiety or an alkali or alkaline earth metal ion. Suitable cationic surfactants can be selected from high-molecular-weight fatty amines, ammonium or other nitrogen derivatives of long chain carboxylic acids. The anionic and cationic emulsifiers may contain a polyoxyalkyl group. Good results-have been obtained with bisalkylsulphosuccinates, sorbitol-$C_{8-20}$-carboxylates and/or $C_{8-20}$-alkylxylene sulphonates. Preferred are the metal salts of bis(2-ethylhexyl)-sulphosuccinic acid.

The amount of the emulsifier to be used is to some extent dependent on the amount of water to be emulsified. Suitably, the amount of emulsifier ranges from 0.01 to 5% wt, based on the amount of vinylarene monomer in the emulsion. Preferred ranges are from 0.1 to 3, more preferred from 0.2 to 1.5% wt.

The amount of water to be emulsified which to some extent determines the desired amount of emulsifier, can be chosen between wide ranges. Suitably the amount of water ranges from 1 to 20% wt, based on the weight of vinylarene monomer and water. Well-expandable particles can be obtained when from 3 to 15% wt of water is emulsified. Below 1% wt the expandability may be too low, whereas at very high water contents the particles can yield expanded articles that may run the risk of collapsing.

In the water to be emulsified an electrolyte may be included. Suitable electrolytes are alkali and alkaline earth salts, but other inorganic salts may equally well be used. The electrolyte may lead to a decrease in droplet size and may enhance the water-in-oil character of ionic surfactants. Therefore, it may be advantageous to use a water phase with from 0.5 to 5% wt of electrolyte, based on amount of water, especially when an ionic emulsifier is used. Preferred salts are alkali metal halides, such as NaCl and KCl.

The pre-polymerisation step may be conducted in-any known manner. This includes free-radical polymerisation and thermal radical polymerization. Thermal polymerisation can be effected by heating the emulsion to a temperature of 120 to 150° C. When the desired conversion has been achieved the temperature is reduced. If the pre-polymerisation step is carried out by thermal radical polymerisation with water already present, the pre-polymerisation needs to be carried out at elevated pressure. If the pre-polymerisation step is carried out by thermal radical polymerisation before water is added, the pre-polymerised mass will generally be cooled before adding water. This makes that in most cases it is preferred to pre-polymerise by free-radical polymerisation with the help of one or more free-radical initiators. For the same reasons, the polymerisation step c) is preferably conducted by free-radical polymerisation. Pre-polymerisation by means of free-radical polymerisation can be carried out by adding an initiator to the vinylarene/water emulsion and starting the polymerisation by heating to 40–140° C. The pre-polymerisation of step a) is preferably carried out by heating to 40–120° C. The polymerisation of step c) is preferably carried out by heating to 60–140° C. The free-radical polymerisation is suitably carried out at a pressure of 0.5 to 5 bar, preferably 0.7 to 1.5 bar, more preferably at atmospheric pressure. The further process conditions are well-known to the skilled artisan. Most preferably, the final stage of the polymerisation of step c) is carried out at elevated pressure and at a temperature of 110–140° C. in order to further reduce the amount of monomer present in the final product.

Optimal conversion degrees of the pre-polymerised mass may vary for different monomers. Suitably, the conversion varies between 20 and 70% of the vinylarene monomer.

If the conversion is higher than 70%, the viscosity of the pre-polymerised mass may be so high that handling problems may occur. This can complicate suspending the pre-polymerised mass in the aqueous phase or emulsification of water into the pre-polymerised mass. If the pre-polymerisation degree is lower than 20%, the suspended droplets will tend to be unstable. In that case, undesirably large amounts of aqueous suspension medium of large droplet size will be incorporated. This will lead to foam collapse during expansion. Preferably, the conversion varies between 30 and 60%.

In order to improve the expansion properties of the eventual polymer particles it is preferred to have cross-linking agent present during polymerisation. The cross-linking agent can be added in step a) and/or in step c). Preferably, the cross-linking agent is added in step a). Suitably, the cross-linking agent is selected from the group of compounds having at least two olefinic double bonds. Examples of such compounds include divinylbenzene, $\alpha,\omega$-alkadienes, e.g. isoprene, the diester of acrylic acid or methacrylic acid with a diol, such as butanediol, pentanediol or hexanediol. Preferred for its compatibility with the vinylarene is divinyl-benzene.

In order to obtain a significant cross-linking effect the amount of the cross-linking agent should not be too low. On the other hand, if the amount of cross-linking agent would be too high, the expandability of the eventual particles would be deteriorated. A suitable range is from 0.01 to 5% wt, preferably from 0.01 to 1.5% wt, based on the amount of vinylarene monomer. Most preferably from 0.01 to 0.5% wt of cross-linking agent is used.

Further, it has been found to be advantageous to polymerise the vinylarene monomer in the presence of a polyphenylene ether. The presence of polyphenylene ether reduces the chance that the foamed material collapses during cooling. Suitable polyphenylene ethers have been described in EP-A-350137, EP-A-403023 and EP-A-391499. The polyphenylene ether can be added in step a) and/or in step c). Preferably, the polyphenylene ether is added in step a). The polyphenylene ether compound preferably is present in an amount of between 1 and 30% wt, based on amount of vinylarene.

Subsequent to the pre-polymerisation step, the pre-polymerised mass is suspended in an aqueous medium. The volume ratio between the aqueous suspension medium and the pre-polymerised mass may vary between wide ranges, as will be appreciated by a person skilled in the art. Suitable volume ratios include 1:1 to 1:10 (pre-polymerised mass:aqueous phase). The optimal ratio is determined by economic considerations.

The aqueous medium may contain one or more conventional stabilizing agents, such as polyvinylalcohol, gelatine, polyethyleneglycol, hydroxyethylcellulose, carboxymethylcellulose, polyvinylpyrrolidone, polyacrylamide, but also salts of poly(meth)acrylic acid, phosphonic acid or (pyro)phosphoric acid, maleic acid, ethylene diamine tetracetic acid, and the like, as will be appreciated by the person skilled in the art. Suitable salts include the ammonium, alkali metal and alkaline earth metal salts. An advantageous example of such a salt is tricalcium phosphate. Preferably, the stabilizing agent is based on acrylic acid and/or methacrylic acid, optionally in combination with acrylic amide. The amount of the stabilizing agents may suitably vary from 0.05 to 1, preferably from 0.15 to 0.6% wt, based on the weight of the aqueous medium.

For the same reasons as apply to pre-polymerisation step a), the polymerisation step c) is advantageously effected by free-radical polymerisation by means of one or more free-radical initiators.

The polymerisation can be further improved-by increasing the stability of the suspension. Such a stability increase can be effected by incorporation of a polar polymer into the pre-polymerised mass in addition to the emulsifying agent already present. Examples of such polymers are polyvinylalcohol, gelatine, polyethyleneglycol, hydroxyethylcellulose, carboxymethylcellulose polyvinylpyrrolidone, polyacrylamide, but also salts of poly (meth)acrylic acid, phosphonic acid or (pyro)phosphoric acid, maleic acid, ethylene diamine tetracetic acid. Suitable salts include the ammonium, alkali metal and alkaline earth metal salts. Preferably, the stabilizing polar polymer is based on acrylic acid and/or methacrylic acid, optionally in combination with acrylic amide. The incorporation may be effected by mixing the polar polymer with the pre-polymerised mass, but it may also be incorporated in-situ by mixing the corresponding polar monomer with the vinylarene monomer and water and polymerising the polar monomer to yield the polar polymer desired. Subsequently, the polar polymer may be suspended together with the other components of the pre-polymerised mass. Another way to incorporate the polar polymer is to add the corresponding polar monomer to the pre-polymerised mass and subsequently polymerise the monomers to yield the polar polymer. The amount of polar polymer is suitably from 0.1 to 10% by weight, based on water emulsified.

The free-radical initiator can be selected from the conventional initiators for free-radical styrene polymerization. They include in particular organic peroxy compounds, such as peroxides, peroxycarbonates and peresters. Combinations of peroxy compounds can also be used. Typical examples of the suitable peroxy initiators are $C_6$–$C_{20}$ acyl peroxides such as decanoyl peroxide, benzoyl peroxide, octanoyl peroxy, stearyl peroxide, 3,5,5-trimethyl hexanoyl peroxide, peresters of $C_2$–$C_{18}$ acids and $C_1$–$C_5$ alkyl groups, such as t-butylperbenzoate, t-butylperacetate, t-butyl-perpivalate, t-butylperisobutyrate and t-butyl-peroxylaurate, and hydroperoxides and dihydrocarbyl ($C_3$–$C_{10}$)peroxides, such as diisopropylbenzene hydroperoxide, di-t-butyl peroxide, dicumyl peroxide or combinations thereof.

Radical initiators different from peroxy compounds are not excluded. A suitable example of such a compound is α,α'-azobisisobutyronitrile. The amount of radical initiator is suitably from 0.01 to 1% wt, based on the weight of the vinylarene monomer. The process is suitably initiated by heating the reaction mixture to elevated temperature, e.g., in the range of 40 to 140° C.

The polymerisation process may suitably be carried out in the presence of a chain transfer agent. The person skilled in the art will appreciate that these chain transfer agents can be selected from mercaptans, such as $C_2$–$C_{15}$-alkyl mercaptans, e.g. n-dodecylmercaptan, t-dodecylmercaptan, n-butyl mercaptan or t-butylmercaptan. Preferred are aromatic compounds such as pentaphenyl ethane, and in particular the dimer of α-methyl styrene.

The present invention has enabled the skilled artisan to prepare water-foamable particles that contain water as foaming agent. Accordingly, the present invention provides expandable polymer particles comprising a polymer of a vinylarene monomer, water in the form of droplets, and an emulsifier, in which the amount of water ranges from 8.6 to 15% wt, based on the total weight of the polymer particles. The polymer particles do not need to contain $C_3$–$C_6$ hydrocarbon foaming agent. This means that the hydrocarbon foaming agent can be present in an amount less than 0.5% wt based on total amount of polymer particles, preferably less than 0.25% wt, more preferably in the complete absence of such foaming agents.

The polymer particles may further contain several additives or coatings in effective amounts. Such additives include dyes, fillers, stabilisers, flame retarding compounds, nucleating agents, antistatic compounds and lubricants. of particular interest are coating compositions containing glycerol- or metal carboxylates. Such compounds reduce the tendency of the particles to agglomerate. Suitable carboxylates are glycerol mono-, di- and/or tristearate and zinc stearate. Examples for such additive composition are disclosed in GB-A-1,409,285. The coating composition are deposited onto the particles via known methods e.g. via dry-coating in a ribbon blender or via a slurry or solution in a readily vaporising liquid.

The particles have advantageously an average diameter of 0.1 to 6 mm, preferably from 0.4 to 3 mm.

The expandable particles can be prefoamed by hot air or by using (superheated) steam, to yield expanded or pre-expanded particles. Such particles have a reduced density, e.g. from 800 to 30 kg/m$^3$. It will be appreciated that in order to vapourise the water included in the particles to effect foaming, the temperature must be higher than used for $C_3$–$C_6$ hydrocarbon foaming agents which have a lower boiling point than water. Foaming can also be effected by heating in oil or by microwaves.

The invention will be further illustrated by means of the following examples.

EXAMPLE 1

In an autoclave of 2 litres, an amount of styrene was mixed with 0.4% wt, based on styrene, of dibenzoyl peroxide and 0.15% wt, based on styrene, of tert-butyl peroxybenzoate together with sodium bis(2-ethylhexyl) sulphosuccinate (sold under the trade mark "AOT") under nitrogen at a stirring rate of 300 rpm. The mixture was subsequently polymerised by heating to 90° C. for 100 minutes. The conversion degree of styrene was about 55%. Water containing 0.9% wt of sodium chloride was slowly added to the pre-polymerised mass whilst stirring at 800 rpm. The stirring was continued for 5 minutes. In a 6.4 litres autoclave, the emulsion thus obtained was m suspended in water containing 0.4% by weight of hydroxyethyl cellulose sold under the trade mark "NATROSOL 250G" by the Dutch company "AQUALON". The weight ratio of water to pre-polymerised mass was about 3:1. The polymerisation reaction was continued at 90° C. for 5 hr. The nitrogen pressure was increased to 4 bar and the temperature was increased to 125° C. The suspension was maintained at these conditions for a further 5 hours to complete the polymerization. The polymer beads were separated from the water phase, and washed with water. The water content of these beads, based on amount of polystyrene, water and emulsifier, was determined by TGA (thermal gravimetric analysis). The beads were expanded in hot air of 130° C. in a 500 ml glass vessel with the help of a hot air gun. The results are indicated in Table 1 below. The expandability is expressed as ratio of expanded volume of the beads to volume of the beads before expansion.

TABLE 1

| Exp. No. | Starting material, g | | | Polymer beads | |
|---|---|---|---|---|---|
| | Styrene | AOT | water | water content, % wt | expandability |
| 1.1 | 940 | 6 | 60 | 8.6 | 11.4 |
| 1.2 | 920 | 8 | 80 | 9.3 | 13.6 |
| 1.3 | 900 | 10 | 100 | 11.3 | 13.9 |

Comparative Example

In an autoclave of 2 litres, 900 g of styrene was mixed with 0.4% wt, based on styrene, of dibenzoyl peroxide and 0.15% wt, based on styrene, of tert-butyl peroxybenzoate together with 10 g of sodium bis(2-ethyl-hexyl) sulphosuccinate (sold under trade mark "AOT") under nitrogen at a stirring rate of 300 rpm. Slowly 100 g of water containing 0.9% wt of sodium chloride was added whilst stirring at 800 rpm. The stirring was continued for 5 minutes. In a 6.4 litres autoclave, the mixture thus obtained was suspended in 3 l water containing 0.4% by weight of hydroxyethyl cellulose sold under the trade mark "NATROSOL 250G". The weight ratio of water to styrene containing mass was about 3:1. It was observed that no separate droplets could be seen. This is probably due to the fact that an oil-in-water emulsion had been formed. The polymerisation reaction was continued at 90° C. After approximately 2 hours, the stirrer of the reactor stalled. When the reactor was opened it was found that the emulsion had changed into a solid, white lump and water.

EXAMPLE 2

In a vessel of 6 litres, 3600 g of styrene was mixed with 0.4% wt, based on styrene, of dibenzoyl peroxide and 0.15% wt, based on styrene, of tert-butyl peroxybenzoate together with 40 g of sodium bis(2-ethylhexyl)sulphosuccinate (sold under trade mark "AOT") under nitrogen at a stirring rate of 300 rpm. The mixture was subsequently polymerised by heating to 90° C. for 100 minutes. The conversion degree of styrene was about 55%. Slowly, 400 g of water containing 0.9% wt of sodium chloride was added whilst stirring at 800 rpm. The stirring was continued for 5 minutes. In a 10 litres autoclave, the emulsion thus obtained was suspended in 4 l water containing 0.4% by weight of hydroxyethyl cellulose sold under the trade mark "NATROSOL 250G". The weight ratio of suspension water to pre-polymerised mass was about 1:1. The polymerisation reaction was continued at 90° C. for 5 hr while stirring at 350 rpm. The nitrogen pressure was increased to 4 bar and the temperature was increased to 125° C. The suspension was maintained at these conditions for a further 5 hours to complete the polymerization. The polymer beads were separated from the water phase, and washed with water. The water content of these beads, based on amount of polystyrene, water and emulsifier, was determined by TGA. The beads were expanded in hot air in a 500 ml glass vessel with the help of a hot air gun. The results are indicated in Table 2 below.

EXAMPLE 3

In an autoclave of 2 litres, 900 g styrene was mixed with 0.4% wt, based on styrene, of dibenzoyl peroxide and 0.15% wt, based on styrene, of tert-butyl peroxybenzoate together with 10.0 g sorbitan tristearate (sold under the trade mark "SPAN 65") under nitrogen at a stirring rate of 300 rpm. The mixture was subsequently polymerised by heating to 90° C. for 100 minutes. The conversion degree of styrene was about 55%. Slowly, 100 g of water containing 0.9% wt of sodium chloride was added whilst stirring at 800 rpm. The stirring was continued for 5 minutes. In a 6.4 l autoclave, the emulsion thus obtained was suspended in 3 l water containing 0.4% by weight of hydroxyethyl cellulose sold under the trade mark "NATROSOL 250G". The weight ratio of water to pre-polymerised mass was about 3:1. The polymerisation reaction was continued at 90° C. for 5 hr. The nitrogen pressure was increased to 4 bar and the temperature-was increased to 125° C. The suspension was maintained at these conditions for a further 5 hours to complete the polymerization. The polymer beads were separated from the water phase, and washed with water. The water content of these beads, based on amount of polystyrene, water and emulsifier, was determined by TGA. The beads were expanded in hot air in a 500 ml glass vessel with the help of a hot air gun. The results are indicated in Table 2 below.

EXAMPLE 4

In an autoclave of 2 litres, 900 g styrene was mixed with 0.4% wt, based on styrene, of dibenzoyl peroxide and 0.15% wt, based on styrene, of tert-butyl peroxybenzoate together with 10.0 g sorbitan monooleate (sold under the trade mark "SPAN 80") under nitrogen at a stirring rate of 300 rpm. The mixture was subsequently polymerised by heating to 90° C. for 100 minutes. The conversion degree of styrene was about 55%. Slowly, 100 g of water containing 0.9% wt of sodium chloride was added whilst stirring at 800 rpm. The stirring was continued for 5 minutes. In a 6.4 l autoclave, the emulsion thus obtained was suspended in 3 l water containing 0.4% by weight of hydroxyethyl cellulose sold under the trade mark "NATROSOL 250G". The weight ratio of water to pre-polymerised mass was about 3:1. The polymerisation reaction was continued at 90° C. for 5 hr. The nitrogen pressure was increased to 4 bar and the temperature was increased to 125° C. The suspension was maintained at these conditions for a further 5 hours to complete the polymerization. The polymer beads were separated from the water phase, and washed with water. The water content of these beads, based on amount of polystyrene, water and emulsifier, was determined by TGA. The beads were expanded in hot air in a 500 ml glass vessel with the help of a hot air gun. The results are indicated in Table 2 below.

EXAMPLE 5

In an autoclave of 2 litres, 900 g styrene-was mixed with 10.0 g of sodium bis(2-ethylhexyl)sulphosuccinate (sold under trade mark "AOT"). The mixture was heated to 60° C. 99 g of distilled water, 1 g of acrylic acid and 0.03 g potassium persulphate were slowly added to the mixture whilst stirring at 800 rpm. The stirring was continued for 5 minutes. The emulsion obtained was heated to 60° C. for 3 hours to allow the acrylic acid to polymerize, whilst stirring at 800 rpm.

To this were added, 0.4% wt of dibenzoyl peroxide, based on styrene, and 0.15% wt of tert-butyl peroxybenzoate, based on styrene, and the temperature was raised to 90° C. This temperature was maintained for 100 minutes. The conversion degree of styrene was about 55%. In a 6.4 litres autoclave, the emulsion thus obtained was suspended in 3 l water containing 0.4% by weight of hydroxyethyl cellulose sold under the trade mark "NATROSOL 250G". The volume ratio of suspension water to pre-polymerised mass was about 3:1. The polymerisation reaction was continued at 90° C. for 5 hr while stirring at 350 rpm. The nitrogen pressure was increased to 4 bar and the temperature was increased to 125° C. The suspension was maintained at these conditions for a further 5 hours to complete the polymerization. The polymer beads were separated from the water phase, and washed with water. The water content of these beads, based on amount of polystyrene, water and emulsifier, was determined by TGA. The beads were expanded in hot air in a 500 ml glass vessel with the help of a hot air gun. The results are indicated in Table 2 below.

EXAMPLE 6

In an autoclave of 2 litres, 900 g styrene was mixed with 0.45 g of divinylbenzene, 0.4% wt of dibenzoyl peroxide, based on styrene, and 0.15% wt of tert-butyl peroxybenzoate, based on styrene, and 10.0 g of sodium bis(2-ethylhexyl)sulphosuccinate (sold under trade mark "AOT"). The mixture was heated to 90° C. during 100 minutes, and stirred at 300 rpm. 100 g of distilled water containing 0.9% wt of sodium chloride was slowly added whilst stirring at 800 rpm. The stirring was continued for 5 minutes. The conversion degree of styrene was about 55%. In a 6.4 litres autoclave, the emulsion thus obtained was suspended in 3 l water containing 0.4% by weight of hydroxyethyl cellulose sold under the trade mark "NATROSOL 250G". The polymerisation reaction was continued at 90° C. for 5 hr while stirring at 350 rpm. The nitrogen pressure was increased to 4 bar and the temperature was increased to 125° C. The suspension was maintained at these conditions for a further 5 hours to complete the polymerization. The polymer beads were separated from the water phase, and washed with water. The water content of these beads, based on amount of polystyrene, water and emulsifier, was determined by TGA. The beads were expanded in hot air in a 500 ml glass vessel with the help of a hot air gun. The results are indicated in Table 2 below.

TABLE 2

| | | Polymer beads | |
|---|---|---|---|
| Exp. no. | Additive | water content % wt | expandability (measured at) |
| 2 | AOT | 11.3 | 17 (135° C.) |
| 3 | SPAN 65 | 11.5 | 13 (130° C.) |
| 4 | SPAN 80 | 12.2 | 11 (130° C.) |
| 5 | AOT/acrylic acid | 12.3 | 14 (135° C.) |
| 6 | AOT/divinylbenzene | 12.0 | 15 (140° C.) |

What is claimed is:

1. Process for the preparation of polymer particles containing a vinylarene polymer by suspension polymerization, which process comprises:

a) pre-polymerising vinylarene monomers to a conversion degree of 20 to 70%, based on the vinylarene monomer, to yield a pre-polymerised mass, which pre-polymerised mass further contains water emulsified therein and an emulsifier, which pre-polymerisation is carried out with water already present or before water is added;

b) suspending the pre-polymerised mass in an aqueous medium to yield suspended droplets; and c) polymerising the vinylarene monomer in the suspended droplets to complete monomer conversion to yield suspended polymer particles.

2. Process according to claim 1, in which the polymer particles obtained are separated from the aqueous mixture and expanded to yield pre-expanded particles.

3. Process according to claim 1, in which the water, an emulsifier and the vinylarene monomer are stirred to create an emulsion which is subsequently subjected to pre-polymerization to the desired conversion degree to yield the pre-polymerized mass.

4. Process according to claim 1, in which the vinylarene monomer is first subjected to prepolymerisation in the presence of emulsifier, and, subsequently, water is added to the pre-polymerised vinylarene mixture and water is emulsified.

5. Process according to claim 1, in which the emulsifier is selected from bisalkylsulphosuccinates, sorbitol-$C_{8-20}$-carboxylates and $C_{8-20}$-alkylxylene sulphonates.

6. Process according to claim 1, in which the amount of emulsifier ranges from 0.01 to 5% wt, baseded on the amount of vinylarene monomer.

7. Process according to claim 1, in which the amount of water to be used in step a) ranges from 1 to 20% wt, based on the weight of water and vinylarene monomer.

8. Process according to claim 1, in which the pre-polymerisation step a) and the polymerisation step c) are conducted by free-radical polymerization.

9. Process according to claim 1, in which polar polymers are incorporated in the pre-polymerised mass.

10. Process according to claim 1, in which cross-linking agent is present during polymerisation.

* * * * *